No. 781,863. PATENTED FEB. 7, 1905.
W. N. ALLEN.
DISK PLOW.
APPLICATION FILED SEPT. 18, 1903.
2 SHEETS—SHEET 2.
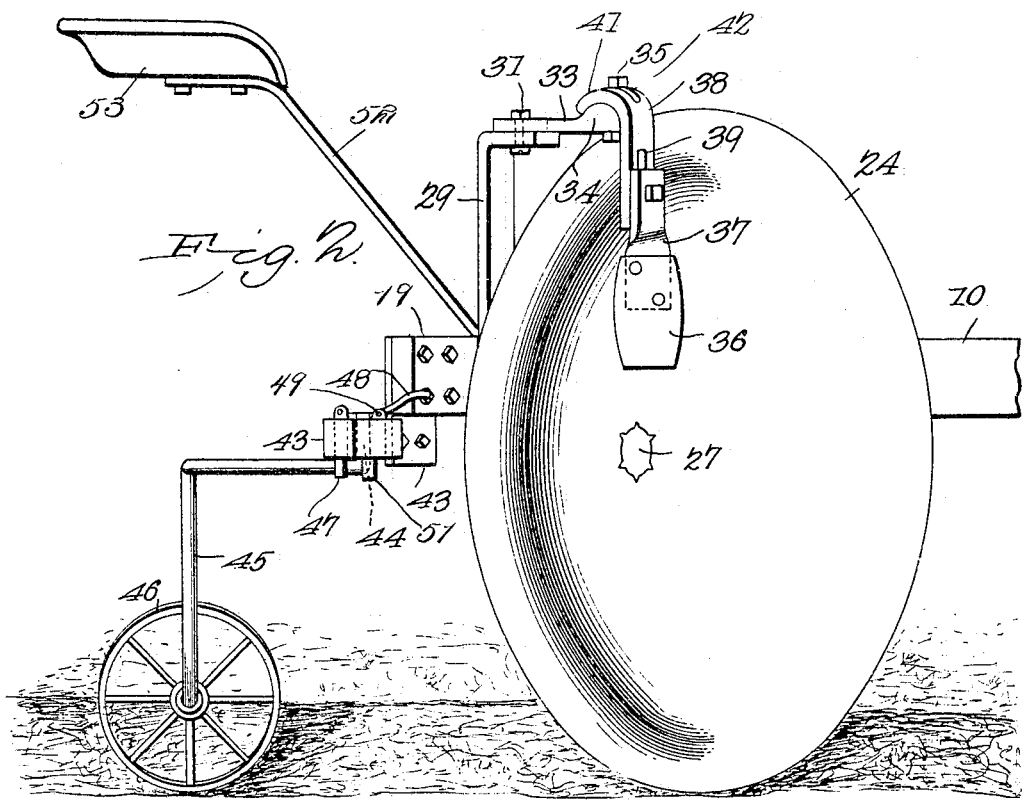
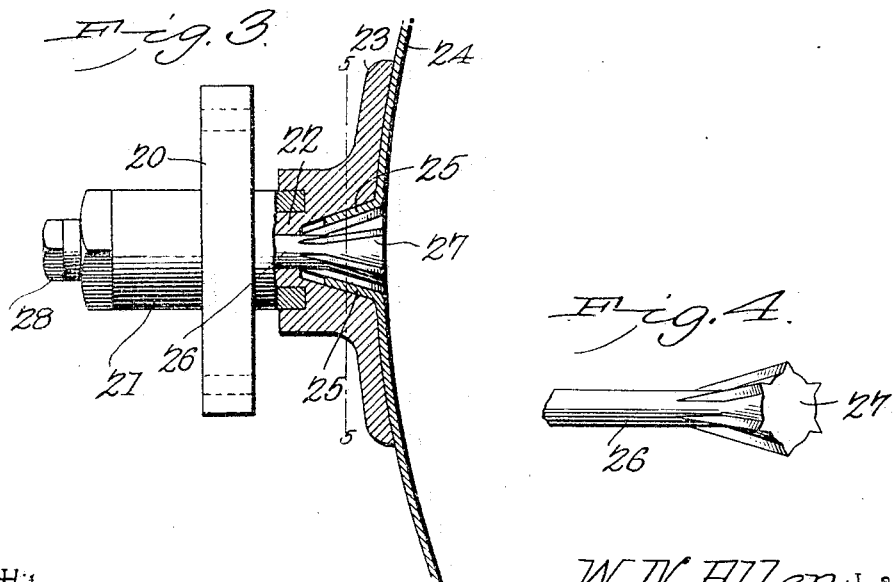
Witnesses
E. F. Stewart
C. N. Woodward.
W. N. Allen, Inventor.
by C. A. Snow & Co.
Attorneys No. 781,863.  
Patented February 7, 1905.

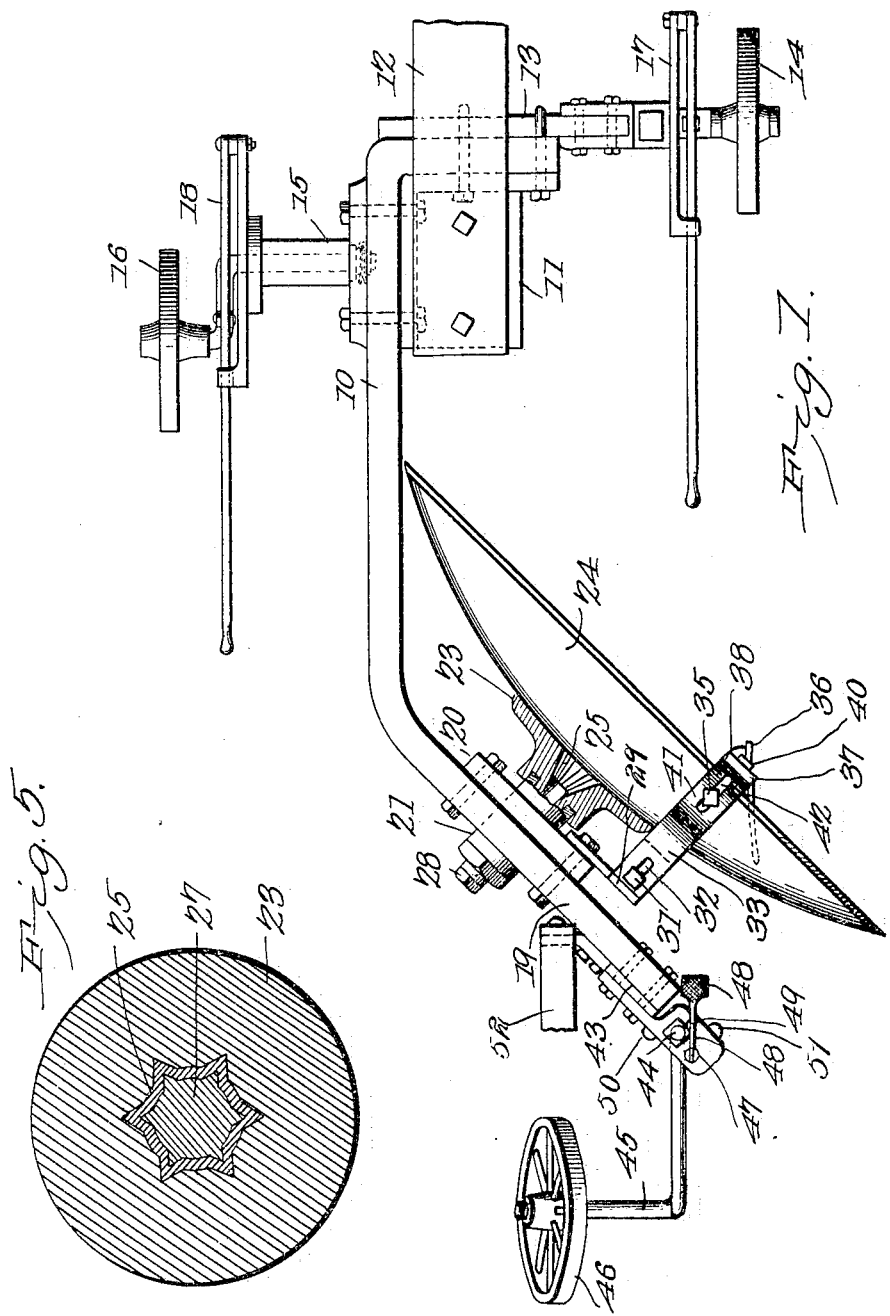

UNITED STATES PATENT OFFICE.

WILLIAM N. ALLEN, OF IRONTON, OHIO.

DISK PLOW.

SPECIFICATION forming part of Letters Patent No. 781,863, dated February 7, 1905.

Application filed September 18, 1903. Serial No. 173,723.

*To all whom it may concern:*

Be it known that I, WILLIAM N. ALLEN, a citizen of the United States, residing at Ironton, in the county of Lawrence and State of Ohio, have invented a new and useful Disk Plow, of which the following is a specification.

This invention relates to disk plows, and has for its object to simplify and improve the construction and produce an implement of increased strength and utility without increase of expense or weight and which may be more readily controlled and kept free from the accumulations of earth when employed in sticky or wet soil; and the invention consists in certain novel features of construction, as hereinafter shown and described, and specified in the claims.

In the drawings illustrative of the invention, in which corresponding parts are denoted by like designating characters, Figure 1 is a plan view, partly in section, of the improved device. Fig. 2 is a side elevation of the rear portion of the device. Fig. 3 is a sectional detail illustrating the manner of connecting the cutting-disk to its rotative support. Fig. 4 is a perspective view of the disk-holding bolt detached. Fig. 5 is a transverse section, enlarged, on the line 5 5 of Fig. 3.

The improved implement consists of a main supporting-frame 10, having a bracket 11 at the forward end, to which the draft-tongue 12 is attached, and carrying the frame 13 of the forward furrow-wheel 14 and a bracket 15 for the "land-wheel" 16. The furrow-wheel 14 and land-wheel 16 are provided, respectively, with adjusting mechanism (represented at 17 18) of the usual construction; but as these portions of the implement are not a novel feature of the present invention they are not further illustrated, as the construction of such devices is so well known.

Attached to the face of the inclined portion 19 of the frame is a bracket 20, upon whose lower side a transverse sleeve 21 is formed, the sleeve 21 supporting a stud 22 for rotation therein, the stud having a concaved plate 23 on its outer end engaging the convex side of a concavo-convex cutting-disk 24. The plate 23 and its stud 22 are provided with a central aperture, the walls of the outer end of the aperture being flared and provided with spaced corrugations in the sides of the flared portion and the disk 24 being formed with a corresponding central aperture surrounded by a conical extension 25, conforming to the flared cavity in the plate 23 and correspondingly corrugated. Fitting the aperture in the parts 22 23 24 is a clamp-bolt 26, having a conical outer end 27, corrugated to correspond to the corrugations in the members 23 and 25. By this simple arrangement it will be obvious that when the nut 28 is "set up" on the bolt 26 the disk 24 will be firmly and immovably clamped to the plate 23 and rotative with the plate and its stud in the sleeve 21. The disk is thus very firmly united to the plate by one single bolt, with the strains distributed over a relatively large area by means of the corrugated conical extension 25 and corresponding conical corrugated cavity in the plate 23. The disk is thus not only firmly held in position, but is easily detachable when required for renewal or repairs by simply releasing the one bolt 26. The corrugations thus serve a very important purpose and materially increase the strength of the joint between the parts.

Attached to the outer face of the bracket 20 is a standard 29, projecting horizontally at the upper end and provided with a clamp-bolt 31, engaging a longitudinal slot 32 in an extension-bar 33, the latter terminating in a curved "head" 34, having a clamp-bolt 35. The extension member 33 is thus longitudinally adjustable upon the standard 29.

Engaging the concave face of the disk 24 is a scraper 36, from which an arm 37 extends, as shown, and extending longitudinally of the arm 37 is another arm, 38, connected adjustably to the arm 37 by a slot 39 and bolt 40, as shown. The extension-arm 38 terminates at its free end in a curved portion 41, corresponding to and engaging the curved portion 34 of the member 33. The portion 41 is provided with a longitudinal slot 42, through which the clamp-bolt 35 passes, as shown, to provide for the adjustment between the parts 33 and 38, with the bolt 38 holding it against lateral movement. By these numerous adjustments the scraper 36 may be adapted to the face of the disk 24 and adjusted to all the variations which may occur therein.

At the rear of the frame-section 19 is a bracket 43, having a vertical socket in which a stud 44 on a hanger-frame 45 is rotatively supported, the hanger-frame carrying the rear furrow-wheel 46, the latter preferably set at an angle to the frame 10 19, as shown, and operating in the furrow in the rear of the disk in the ordinary manner. The frame 45 is thus free to swing laterally of the main frame and to hold it in operative position in the furrow. A bolt 47 is disposed in the bracket 43 with its lower end extending into the path of the frame. The bolt 47 has combined with it an operating-lever 48, pivoted at 49 to the bracket and adapted when depressed, as by the foot of the operator, to elevate the bolt 47 and release the frame 45. By this arrangement it will be obvious that when the bolt 47 is in its downward or operative position the frame 45, with its attached furrow-wheel, will also be held in operative position or with the furrow-wheel in the furrow. When it is desired to turn the plow at the end of the furrow, a simple pressure of the foot of the operator will release the frame and permit the furrow-wheel to swing laterally and "trail" after the disk, and thus permit the plow to be moved in a curve or turned around to any desired extent. When the plow is again brought into operative position, the frame 45 will be restored to its former place. By this simple arrangement the plow can be moved in any desired direction without cramping the parts or imposing unnecessary hardship or labor on the draft-animals.

The parts can be constructed of any required size or of any suitable material and will be found very convenient in use, easily operated and controlled.

Stop-lugs 50 51 will be employed upon the bracket 43 to limit the lateral movement of the hanger 45.

A seat-bracket 52, supporting a seat 53, will be connected to the frame, as shown.

Having thus described my invention, what I claim is—

1. In a plow, a main frame carrying a turf-turning element, an auxiliary frame mounted to swing laterally on said main frame in the rear of said turning element and carrying a furrow-wheel, a bolt mounted to slide vertically with one end depending normally into the path of said auxiliary frame, a lever movably mounted on said main frame and connected with said bolt, and abutments on the main frame for limiting the lateral movement of the auxiliary frame.

2. In a plow, a frame carrying a cutting-disk, an upright standard extending from said frame and provided with a lateral extension adjustable longitudinally thereof, a scraper operative against the face of the disk and having an arm extending upwardly therefrom and provided with an extension adjustable longitudinally thereof, the free ends of said standard extension and scraper-arm extension being correspondingly curved and with the curved portions adjustably connected, substantially as described.

In testimony that I claim the foregoing as my own I have hereto affixed my signature in the presence of two witnesses.

WILLIAM N. ALLEN.

Witnesses:
 E. E. KINGREY,
 C. B. EGERTON.